(12) United States Patent
Becker

(10) Patent No.: US 8,469,756 B2
(45) Date of Patent: Jun. 25, 2013

(54) SECTIONAL SPORTBOARD SYSTEM

(76) Inventor: Michael Becker, Blue Point, NY (US)

( * ) Notice: Subject to any disclaimer, the term of this patent is extended or adjusted under 35 U.S.C. 154(b) by 198 days.

(21) Appl. No.: 12/932,438

(22) Filed: Feb. 25, 2011

(65) Prior Publication Data

US 2012/0216389 A1 Aug. 30, 2012

(51) Int. Cl.
*B63B 35/81* (2006.01)
(52) U.S. Cl.
USPC .............................................. 441/74; 114/352
(58) Field of Classification Search
USPC .................................. 114/352; 441/65, 74, 79
See application file for complete search history.

(56) References Cited

U.S. PATENT DOCUMENTS

| | | | | |
|---|---|---|---|---|
| 3,996,868 | A | * | 12/1976 | Schagen ........................ 114/352 |
| 5,176,553 | A | * | 1/1993 | Tuttle ............................... 441/79 |
| 5,711,692 | A | | 1/1998 | Pope |
| 7,029,350 | B2 | | 4/2006 | Katzfey |
| 7,347,755 | B1 | | 3/2008 | Katzfey |
| 7,794,297 | B1 | | 9/2010 | Katzfey |

* cited by examiner

*Primary Examiner* — Lars A Olson
(74) *Attorney, Agent, or Firm* — Richard J. Katz, Esq.

(57) ABSTRACT

A sectional sportboard including a first and second separate sections having opposing mating surfaces transverse to a longitudinal axis of the sectional sportboard. The first section and the second section each having at least two hollow receptacles, the hollow receptacles in each section having an opening forming a continuous circumference aperture in the mating surface, and corresponding receptacles axially aligned and located parallel to the longitudinal axis, one or more pairs of first through holes extending at an angle from a first section outer surface to a position on the first section mating surface, and one or more pairs of first blind holes located in the second section mating surface at a position and an angle axially corresponding to the one or more pairs of first through holes, each of the through holes and blind holes having an aperture with a continuous circumference in the respective mating surface.

20 Claims, 4 Drawing Sheets

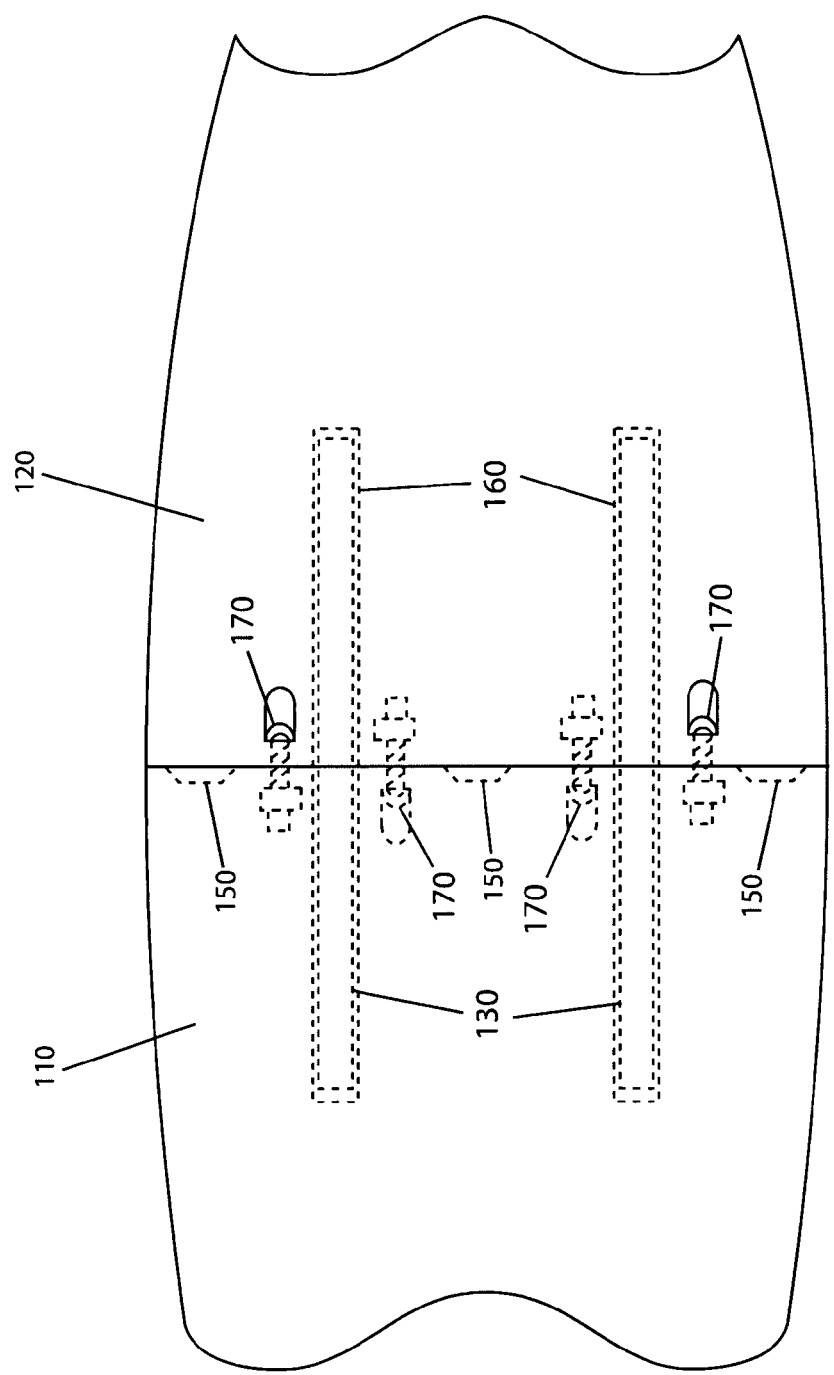

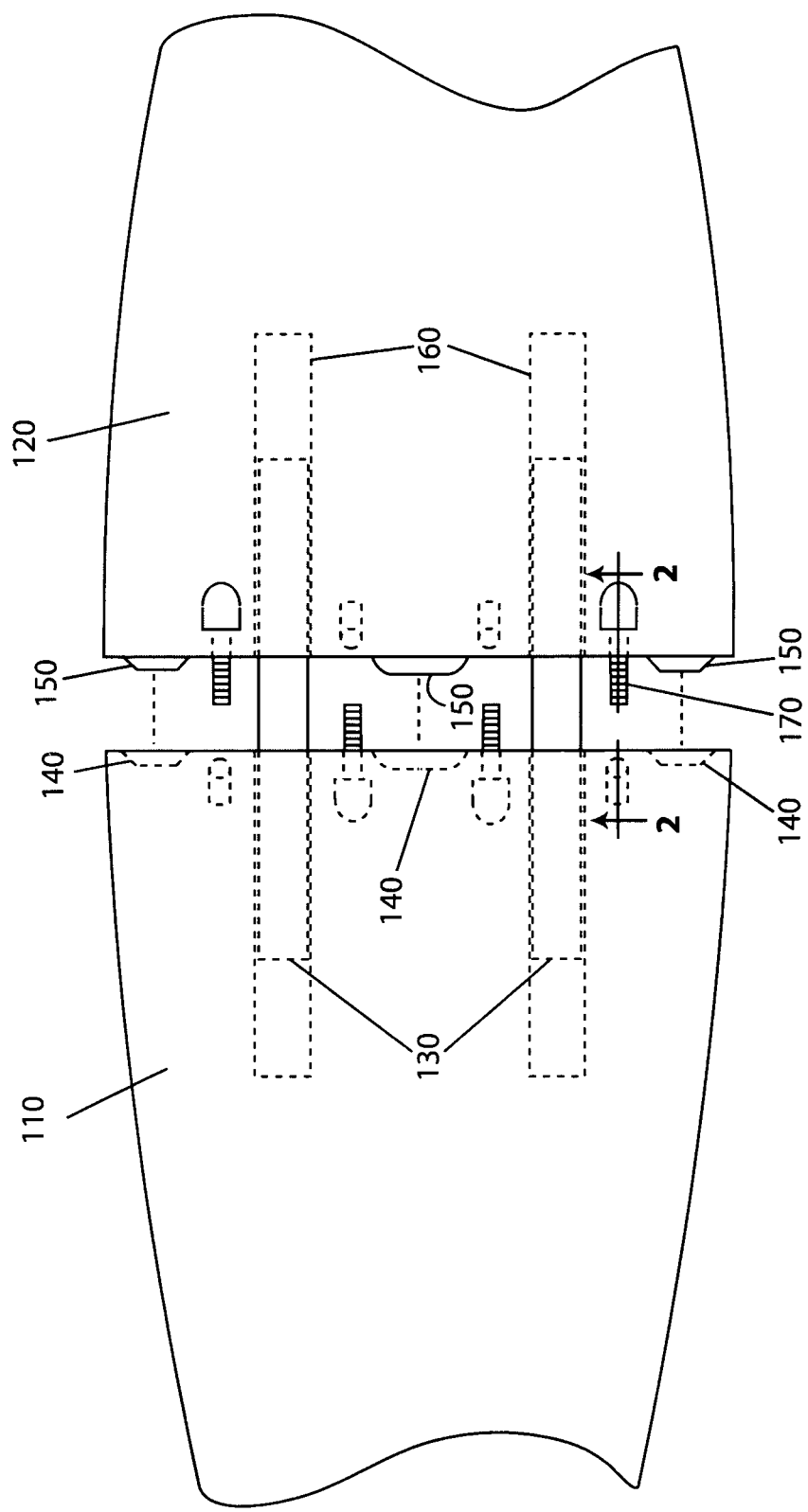

SECTIONAL SPORTBOARD SYSTEM

BACKGROUND

There has been an increase in the popularity of sportboard-based activity throughout the world. Sportboards may include surfboards, kite boards, snowboards, wind surfboards, stand-up paddleboards, sit-upon kayaks, etc. Enthusiasts of these sports have preferences in their choice of sportboard, and desire to travel to various locales to participate in their chosen activity using their own sportboard.

The various locales may be quite a distance away, and could often be in remote locations. Travel to these locales may require various transportation modalities such as airplanes, railroads, buses, and other forms of transportation that may limit the size of luggage pieces and/or charge excessive premiums for oversize luggage. The typical single piece sportboard may exceed the travel restrictions set by the transportation provider. Additionally, the size of a single-piece sportboard may be unwieldy to handle in crowded transportation facilities.

Sectional surfboards have been described, but the known techniques joining the sections unfavorably impact the performance of the surfboard. These prior techniques may add too much weight to the surfboard, may stiffen the central region of the surfboard, and may not prevent independent movement at the section seams during use. These problems may reduce, or even destroy, the performance characteristics of the surfboard.

BRIEF DESCRIPTION OF THE DRAWINGS

FIG. 3 illustrates a partial plan view of the embodiment of FIG. 1 in a closed position;

FIG. 4 illustrates a partial plan view of the embodiment of FIG. 1 in an opened position;

DEFINITION OF TERMS

As used herein the term "sportboard" may mean surfboard, kite board, sandboard, snowboard, wind surfboard, skydiving board, stand-up paddleboard, sit-upon kayak, skyboard glider, watercraft, etc.

DETAILED DESCRIPTION

A sectional sportboard in accordance with an embodiment of the invention may provide two or more sections that can be joined together to form a completed sportboard. Each section may be joined by multiple coupling pieces inserted into receptacles located within the sectional pieces. In accordance with an embodiment of the invention, pairs of opposing bolts directed at complementary angles may pull mating sections together. In one implementation, one or more bolts may be used to draw the mating sections together. Matching protrusions (e.g., detents, bumps, etc.) and impressions (e.g., dimples, troughs, etc.) may be positioned along the mating surfaces of the sections to stabilize the mating surfaces so as to maintain a flush fit between the mating sections.

Figure 1:
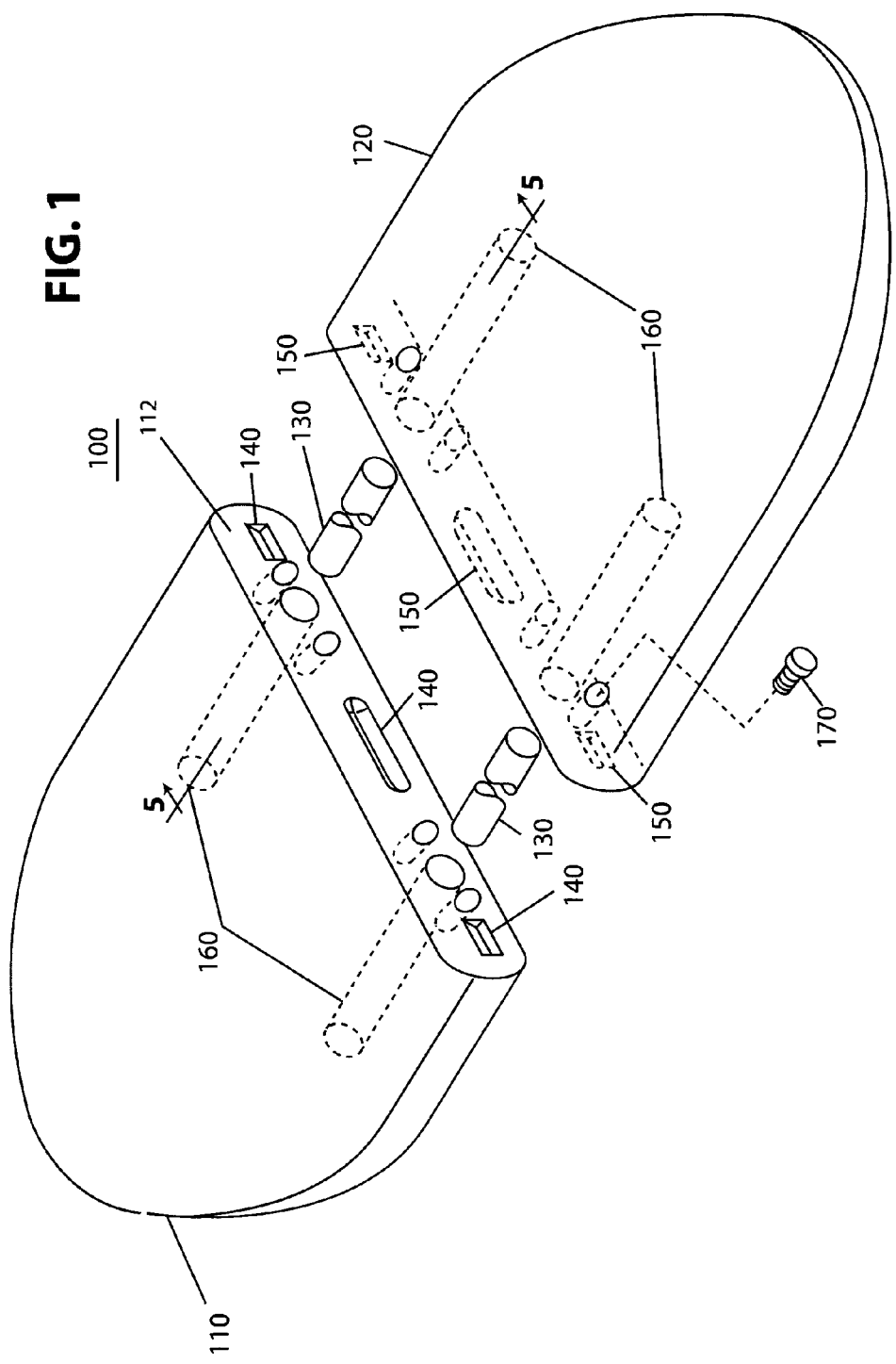
FIG. 1 illustrates a sectional sportboard in accordance with an embodiment of the invention.

FIG. 1 illustrates a sectional sportboard, which may include two or more sections in accordance with an embodiment of the invention. Sectional sportboard 100 as illustrated in FIG. 1 includes two sections—first section 110 and second section 120. First section 110 and second section 120 may be foam-core boards, rotomolded boards, extruded boards, carbon fiber boards. A single sportboard may be sectioned by a cutting operation to form first section 110 and second section 120. In one implementation first section 110 and second section 120 may be molded as separate pieces.

Figure 6:
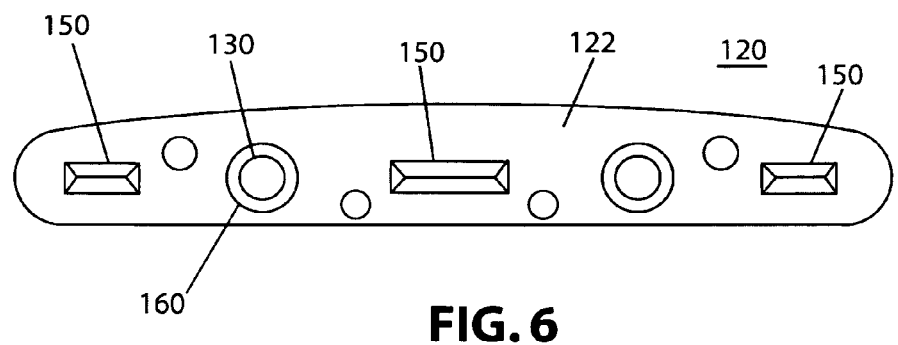
FIG. 6 illustrates a front view of a section of the embodiment of FIG. 1.

First section 110 and second section 120 may include opposing mating surfaces 112, 122 (FIG. 6), respectively. Mating surfaces 112, 122 are positioned transverse to a longitudinal axis of the sectional sportboard, and are substantially perpendicular to outer surfaces of sections 110, 120. Each of section of sportboard 100 may include two or more receptacles 160 embedded within the section. An opening in the receptacle may form an aperture with a continuous circumference in the mating surface of the section. Receptacle 160 may extend within the sportboard section in a longitudinal direction. The corresponding receptacles in corresponding mating sections of the sportboard (e.g., first section 110 and second section 120) may be axially aligned and located parallel to a longitudinal axis of the sectional sportboard for alignment of the mating sections.

Receptacles 160 may be hollow to receive coupling piece 130. In an embodiment in accordance with the invention, two or more receptacles 160 within one section of sectional sportboard 100 may extend beyond a mating surface and may be sized so as to fit within an opposing receptacle within another section of sportboard 100. In such an embodiment, the two sections may be joined together by fitting the smaller-sized receptacles extending from one section into the receptacles of the other section.

Receptacle 160 and coupling piece 130 may be made from a structural material that is resilient, lightweight, and sturdy. In accordance with an embodiment of the invention, receptacle 160 and coupling piece 120 may be thin wall tubes—for example, carbon fiber tubes or other suitable material.

In accordance with an embodiment of the invention, receptacle 160 and coupling piece 130 may have the same cross-section, where the outer dimension of coupling piece 130 is sized to fit within the inner dimension of receptacle 160. The cross-section of the receptacle and coupling piece may be round, square, triangular, elliptical, etc. Coupling piece 130 may be hollow or solid. The length of coupling piece 130 may be long enough so that when inserted to a sufficient depth within a receptacle, about half the length of coupling piece 130 extends beyond the end of the receptacle for insertion into a corresponding receptacle of a mating section.

In one implementation a suction release may be located on an outer surface of coupling piece 130 and/or an inner surface of receptacle 160. The suction release may be a longitudinal groove, a lateral groove, a spiral groove, etc. The suction release may also be a through hole from the wall of coupling piece 130. The suction release may act to break any vacuum that may form, which may keep receptacle 160 and coupling piece 130 from disengaging.

Figure 2:
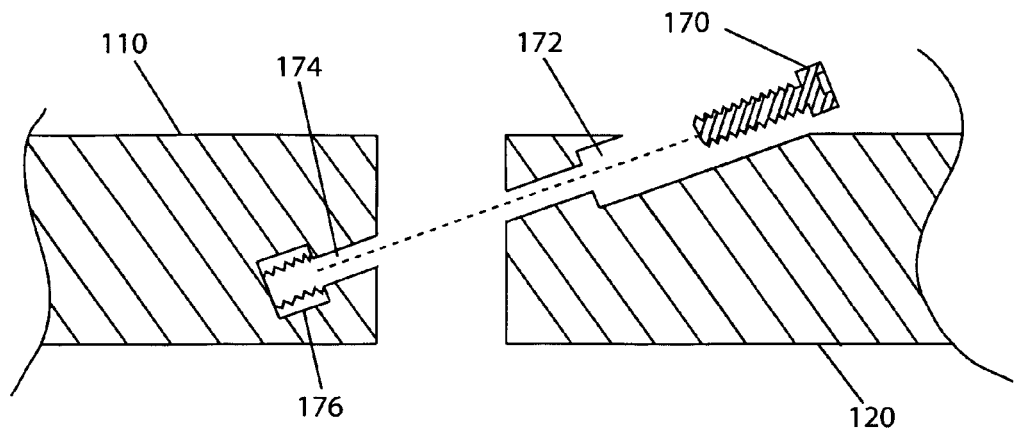
FIG. 2 illustrates a cross-section of the embodiment of FIG. 1 along the line 2-2 shown in FIG. 4.

With reference to FIG. 2, first section 110 may include one or more pairs of retainer 176 accessible from mating surface 112 through blind hole 174. One or more pairs of countersunk through hole 172 may be located on an outer surface of second section 120 extending to mating surface 122 at positions axially corresponding to the location of blind hole 174. Connector 170 may be inserted through countersunk through-hole 172 and into blind hole 174 to engage retainer 176. Engagement of retainer 176 by connector 170 may cause mating surface 112 and mating surface 122 to be drawn together. In one implementation, connector 170 may be a bolt and retainer 176 may be a threaded insert. Other implementations may include a bayonet connection, a quick connect mechanism, etc.

One pair of countersunk through hole 172 may be located on a top surface of second section 120, and at an entry angle of about 45°, with an axially corresponding pair of blind hole 174 at an angle of about 45° with respect to mating surface 112. The angle of entry may be any non-perpendicular angle. Connector 170 may seat against a ledge in the countersunk hole so that when mated with retainer 176 the opposing mating surfaces of the first and second sections are drawn together. In accordance with an embodiment of the invention, a second pair of countersunk through hole 172 and blind hole 174 may be configured as a mirror image to a first pair with the counter-sunk through hole located on a opposite surface of first section 110, and the blind hole located in opposing matting surface 112. These pairs of mirror-image through holes and axially corresponding blind holes may be positioned as an outer pair and an inner pair, where the outer pair are to the outside of receptacle 160 with respect to an edge of sectional sportboard 100, and the inner pair are positioned to the inside of receptacle 160. The through holes and blind holes may each form an aperture having with a continuous circumference in the mating surface of the section.

In accordance with an embodiment of the invention, mating surface 112 may include two or more alignment impressions 140. Alignment impressions 140 may be located on mating surface 112 in positions that oppose the position of alignment protrusions 150 located on mating surface 122. Alignment protrusions 150 may mate with alignment impressions 140 as first section 110 and second section 120 are drawn together by the mating of connector 170 and retainer 176. The mating of the impressions with the protrusion overcomes the localized torque introduced by connector 170 engaging retainer 176. By overcoming this localized torque, the uniformity and planarity of the outer surfaces of sectional sportboard 100 is maintained and stabilized.

FIG. 3 illustrates sectional sportboard 100 in a closed position with first section 110 drawn to second section 112 by the engagement of an inner pair of connector 170 with retainer 176, and by the engagement of an outer pair of connector 170 with retainer 176. Also shown in FIG. 3 are one pair of coupling piece 130 inserted into receptacle 160. FIG. 4 illustrates sectional sportboard 100 in an open position. In the implementation shown in FIG. 4 there are three alignment protrusions 150 protruding from mating surface 112.

Figure 5:
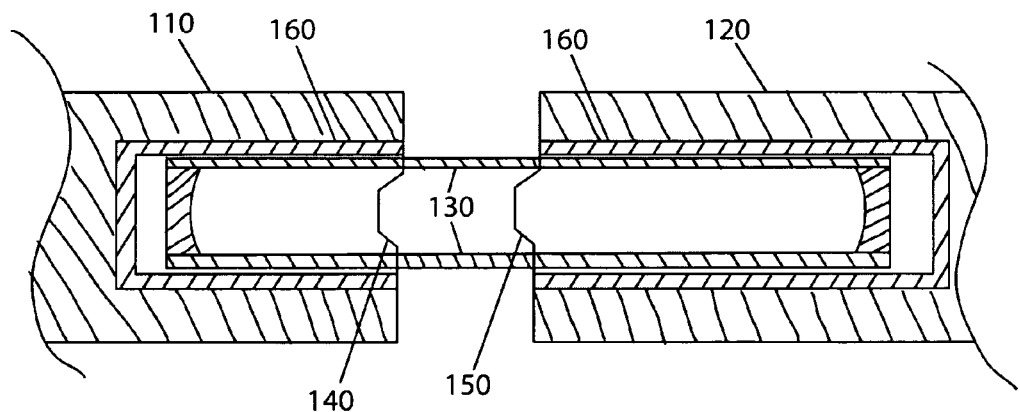
FIG. 5 illustrates a cross-section of the embodiment of FIG. 1 along the line 5-5.

FIG. 5 illustrates a cross-section of sectional sportboard 100 along line 5-5. Receptacle 160 is shown in both first section 110 and second section 120, with coupling piece 130 located within receptacle 160. FIG. 5 also depicts alignment protrusion 150 and alignment impressions 140.

Sectional sportboard 100, in accordance with an embodiment of the invention, may retain the rigidity and integrity of a one-piece sportboard. Sectional sportboard 100 retains the responsiveness and performance of a one-piece sportboard. An embodiment in accordance with the invention offers a light-weight solution to joining a sectional sportboard, while preventing rotational misalignment of the two or more sections of the sportboard. Additionally, the mating of alignment protrusions and slots in conjunction with angular connectors engaging retainers maintains the planarity of the sportboard surfaces.

In one implementation, sectional sportboard 100 may have parabolic rails along the outer edges in place of a central longitudinal stringer. An embodiment in accordance with the invention implemented in a sectional sportboard having parabolic rails may maintain the original flexibility and responsiveness of the central region of the board because the resiliency of the receptacles and coupling piece.

In accordance with an embodiment of the invention, a full length blank, or form, may be used as sectional sportboard 100. One or more pairs of longitudinal troughs may be machined into a surface of the blank. These troughs may be located about a longitudinal centerline of the blank. In one implementation, if the blank is a full-length board, the troughs may be machined about a lateral centerline of the full length. After assembly, the full-length blank may be cut laterally to create first section 110 and second section 120.

In each trough a receptacle 160 may be placed. A compound compatible with the construction of the blank, or form, may be poured into the troughs to fill the remaining space. The surface may be machined flat and encased in a resin-impregnated fiberglass, or similar impervious laminate.

One or more pairs of counter-sunk blind holes may be drilled into the surfaces of the encased blank at about a 45° angle, or any non-perpendicular angle. A first pair of blind holes may be started on the same surface and to one side of the lateral center line. The hole may be drilled to a distance so that it passes across the lateral center line. A second pair of blind holes may be started on an opposite surface of the blank, and on the other side of the lateral center line. Retainer 176 may be inserted into the blind hole to a suitable depth to be positioned on the other side of the lateral center line from its insertion point. Two inserts are placed through an upper surface, and two inserts may be placed through an opposing lower surface. The opening of each blind hole may be countersunk to form a ledge.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

I claim:

1. A sectional sportboard comprising:
   a first and a second separate section;
   the first and the second sections having first and second, respectively, opposing mating surfaces transverse to a longitudinal axis of the sectional sportboard and substantially perpendicular to outer surfaces of the first and second sections;
   at least two hollow receptacles embedded within the first section and at least two hollow receptacles embedded within the second section, the hollow receptacles in each section having an opening forming an aperture in the mating surface, and corresponding receptacles axially aligned and located parallel to the longitudinal axis;
   one or more pairs of first through holes extending at an angle of about 45° from a first section outer surface to a position on the first section mating surface; and
   one or more pairs of first blind holes including a threaded fastener located in the second section mating surface at a position and an angle axially corresponding to the one or more pairs of first through holes, each of the through holes and blind holes having an aperture with a continuous circumference in the respective mating surface.

2. The sectional sportboard of claim 1, further including:

one or more pairs of second through holes extending at an angle from a second section outer surface to a position on the second section mating surface, the second section outer surface on a side of the sectional sportboard opposite the first section outer surface; and one or more pairs of second blind holes located in the first section mating surface at a position and an angle axially corresponding to the one or more pairs of second through holes, each of the through holes and blind holes having an aperture with a continuous circumference in the respective mating surface.

3. The sectional sportboard of claim 1, further including:
said retainer located within each of the one or more pairs of first blind holes; and
one or more pairs of connectors insertable within the one or more pairs of first through holes and configured to engage the retainer located in the first blind holes.

4. The sectional sportboard of claim 2, further including:
said retainer located within each of the one or more pairs of second blind holes; and
one or more pairs of connectors insertable within the one or more pairs of second through holes and configured to engage the retainer located in the second blind holes.

5. The sectional sportboard of claim 1, further including:
two or more alignment impressions located on one of the opposing mating surfaces; and
an equal number of corresponding alignment protrusions located on the other mating surface opposite the alignment slots.

6. The sectional sportboard of claim 5, wherein mating of the alignment impression with the alignment protrusion overcomes any localized torque introduced by a connector in one of the first and second sections engaging said retainer in the other of the first and second sections, wherein overcoming the localized torque maintains the uniformity and planarity of the outer surfaces of the sectional sportboard.

7. The sectional sportboard of claim 1, wherein the first section and second section are portions separated from a single-piece sportboard.

8. The sectional sportboard of claim 1, wherein the first section and the second section each include a form and an outer lamination.

9. The sectional sportboard of claim 1, wherein at least a receptacle in one section is sized to fit within a corresponding receptacle.

10. The sectional sportboard of claim 1, further including a coupling piece for at least each pair of the corresponding receptacles, the coupling pieces having a length sufficient to fit into each member of the pair of corresponding receptacles when the opposing mating surfaces are drawn together.

11. The sectional sportboard of claim 10, wherein an outer dimension of the coupling pieces is sized to fit within an inner dimension of the receptacles.

12. The sectional sportboard of claim 10, the receptacles and the coupling pieces having a cross-section that is one of round, square, triangular, and elliptical.

13. The sectional sportboard of claim 10, wherein the coupling pieces may be hollow or solid.

14. The sectional sportboard of claim 1, including a suction release located on at least one of an outer surface of a coupling piece and an inner surface of the receptacles.

15. The sectional sportboard of claim 14, wherein the suction release is one of a longitudinal groove, a lateral groove, a spiral groove, and a through hole in the outer surface of the coupling pieces.

16. A method for producing a sectional sportboard, comprising the steps of:
providing a receptacle in a sportboard form;
forming at least two holes in a first surface of the form at a non-perpendicular angle with respect to the first surface, the at least two holes sized to receive a connector; and
inserting a threaded retainer within a blind hole in the form, the retainer configured to engage the connector, each blind hole coaxially aligned with a respective one of the at least two holes, each of the blind holes having an aperture with a continuous circumference in a respective mating surface;
the respective mating surface being transverse to a longitudinal axis of the sportboard form and substantially perpendicular to outer surfaces of the sportboard form.

17. The method of claim 16, wherein the form includes at least two sections, each section having at least one lateral surface that opposes another lateral surface on another section of the form, where the opposing lateral surfaces are mating surfaces of the sportboard.

18. The method of claim 16, wherein the form is a full length blank, further including laterally cutting the full length blank into at least two sections so as to expose opposing lateral surfaces.

19. A sectional sportboard comprising:
a first and a second separate section;
the first and the second sections having first and second, respectively, opposing mating surfaces transverse to a longitudinal axis of the sectional sportboard;
at least two hollow receptacles embedded within the first section and at least two hollow receptacles embedded within the second section, the hollow receptacles in each section having an opening forming an aperture in the mating surface, and corresponding receptacles axially aligned and located parallel to the longitudinal axis;
one or more pairs of first through holes extending at an angle from a first section outer surface to a position on the first section mating surface;
one or more pairs of first blind holes located in the second section mating surface at a position and an angle axially corresponding to the one or more pairs of first through holes, each of the through holes and blind holes having an aperture with a continuous circumference in the respective mating surface; and
a suction release located on at least one of an outer surface of a coupling piece and an inner surface of the receptacles.

20. The sectional sportboard of claim 19, wherein the suction release is one of a longitudinal groove, a lateral groove, a spiral groove, and a through hole in the outer surface of the coupling pieces.

* * * * *